March 11, 1969  M. A. STUCK  3,431,706
FLORAL SACKER
Filed Nov. 8, 1966  Sheet 1 of 3
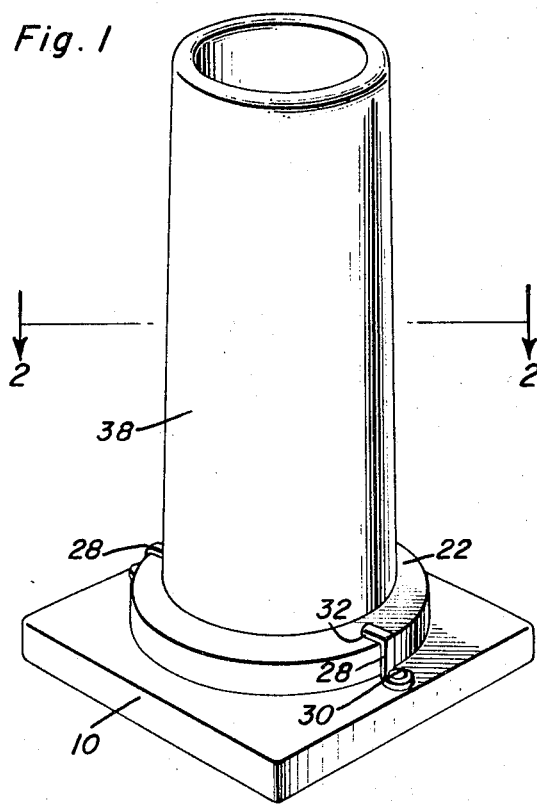
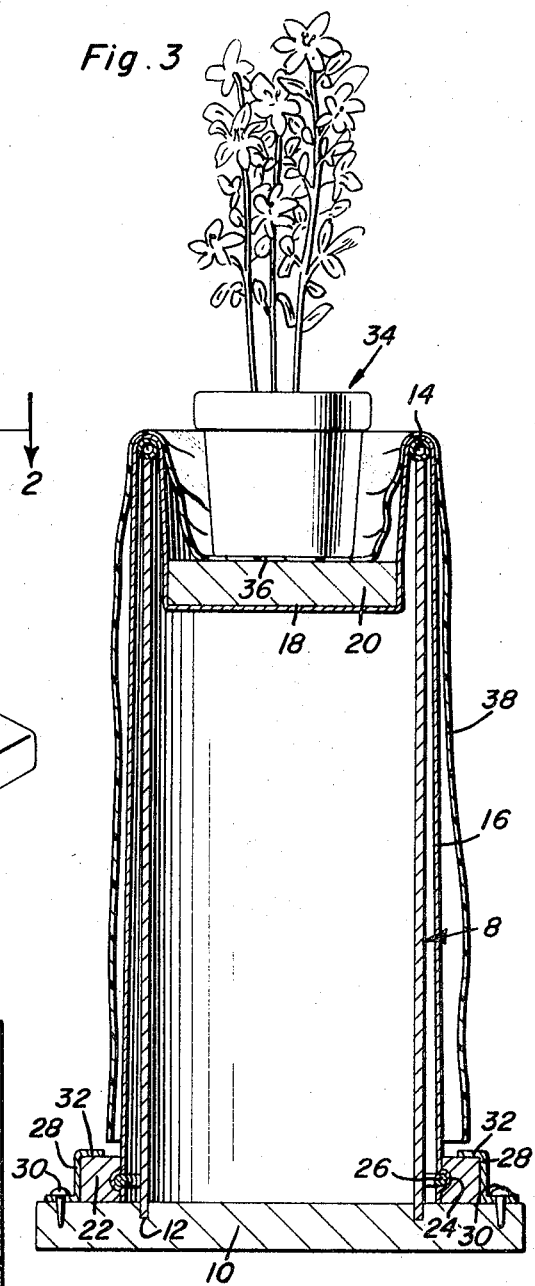
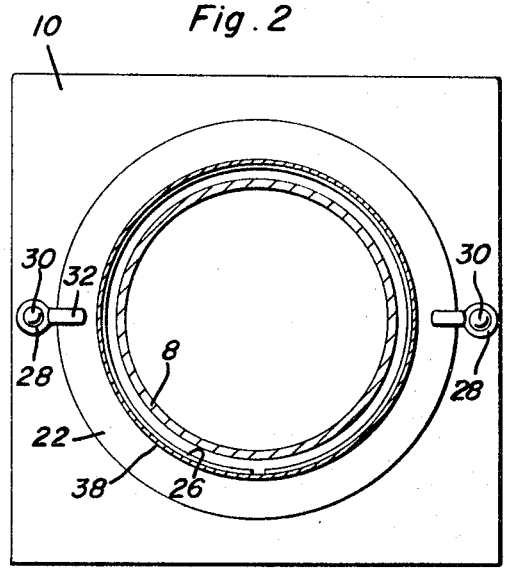
Matthew A. Stuck
INVENTOR.

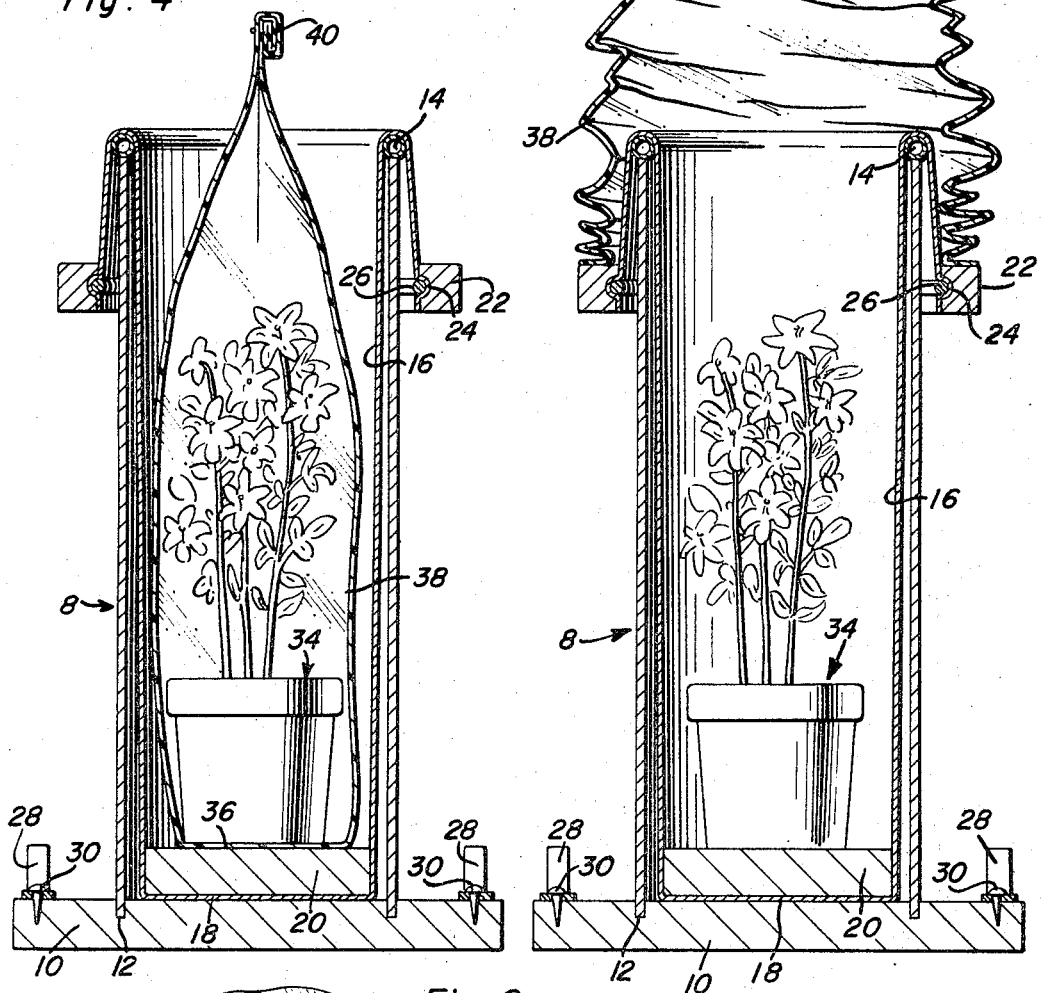
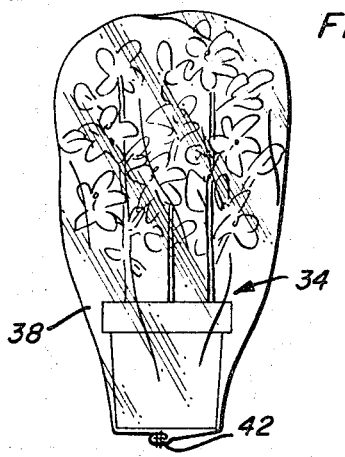

March 11, 1969 — M. A. STUCK — 3,431,706
FLORAL SACKER

Filed Nov. 8, 1966 — Sheet 3 of 3

Matthew A. Stuck
INVENTOR

United States Patent Office 3,431,706
Patented Mar. 11, 1969

3,431,706
FLORAL SACKER
Matthew A. Stuck, Menasha, Wis., assignor to Modern Manufacturing Company, Inc., Menasha, Wis., a corporation of Wisconsin
Continuation-in-part of application Ser. No. 380,895, July 7, 1964. This application Nov. 8, 1966, Ser. No. 603,073
U.S. Cl. 53—390        14 Claims
Int. Cl. B65b 67/00

This application is a continuation-in-part of application Ser. No. 380,895, filed July 7, 1964, now abandoned, and entitled Floral Sacker.

This invention relates to new and useful improvements in sackers for potted and cut flowers, particularly the former, and has for its primary object to provide, in a manner as hereinafter set forth, novel means whereby articles such as plants or flowers may be expeditiously and economically packaged without injury and with unskilled labor.

The present invention is directed to a floral sacker for sacking or bagging articles such as potted plants or cut flowers, in a protective bag without burning or otherwise injuring the leaves or flowers of the plant. According to the invention, a tubular member extends upwardly from a fixed base and a flexible sleeve is slidable over the upper end of the tube with one end of the sleeve being located within the tube and being connected to a movable support or follower which supports the plant to be bagged. The opposite or outer end of the sleeve is located on the outside of the tube and is connected to a locking ring which can be removably locked to the base to prevent movement of the sleeve with respect to the tube.

The closed end of a protective plastic bag is adapted to be positioned within the tube and sleeve, and the bag is draped over the upper end of the tube and then downwardly along the outside of the tube. After placing the potted plant or cut flowers on the follower, the locking ring is unlocked and moved upwardly, causing the follower and the supported plant to move downwardly within the tube. Downward movement of the follower and the sleeve draws the plastic bag inwardly within the tube and around the plant to be bagged.

The floral sacker of the invention serves to sack or bag potted plants or cut flowers in a protective plastic bag without burning or otherwise injuring the leaves or flowers of the plant. As both the plant and the protective bag are moving downwardly within the tube at the same speed, there is no rubbing or abrasion between the plant and the bag.

By employing a series of beads or spherical rollers at the upper edge of the tube, both the sleeve and the plastic bag slide smoothly over the upper end of the tube and are gathered into small uniform folds as they move downwardly into the tube, thereby eliminating the possibility of the leaves of the plant being caught within folded portions of the plastic bag.

The floral bagger of the invention is of simple construction, compact and lightweight and can be manufactured at low cost.

Other objects and advantages will appear in the course of the following description.

The drawings illustrate the best mode presently contemplated of carrying out the invention.

In the drawings:

FIGURE 1 is a perspective view of a floral sacker constructed in accordance with the present invention;

FIGURE 2 is a view in horizontal section through an intermediate portion of the device, taken substantially on the line 2—2 of FIGURE 1;

FIGURE 3 is a vertical sectional view through the device, showing a potted plant in the initial position therein;

FIGURE 4 is a vertical sectional view substantially similar to FIGURE 3 but showing the potted plant in its lowered or second position with the sack or bag closed;

FIGURE 5 is a vertical sectional view substantially similar to FIGURE 4 and illustrating another method of using the device;

FIGURE 6 is an elevational view, showing a plant which has been packaged by the method illustrated in FIGURE 5;

Figure 8:
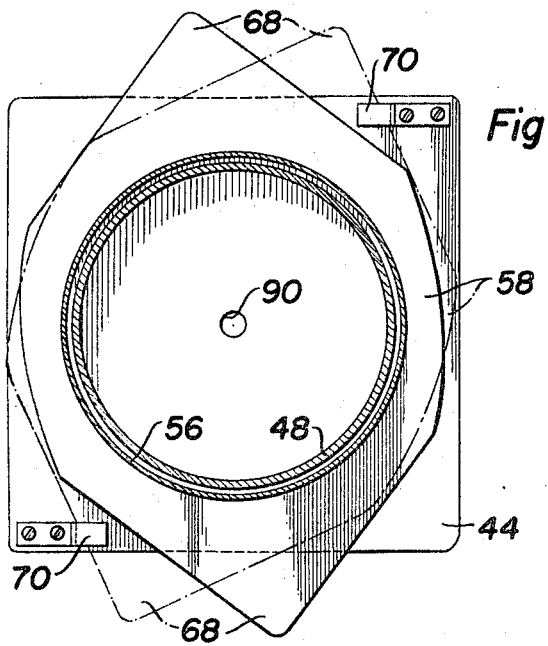
FIGURE 8 is a section taken along line 8—8 of FIGURE 7 with the solid lines showing the locking ring in the unlocked position and the phantom lines showing the locking ring in the locked position.

Referring now to the drawing in detail, it will be seen that the embodiment of the present invention which has been illustrated comprises a vertical cylindrical metallic tube of suitable dimensions which is designed generally by reference numeral 8. In the embodiment shown, the vertical tube 8 has its lower end portion affixed to a square base or platform 10 of wood or other suitable material. The lower end portion of the tube 8 is fixedly secured in an annular groove or channel 12 which is provided therefor in the base 10. Of course, other suitable means may be employed for securing the tube on the base. Fixedly secured in any suitable manner on the upper end of the tube 8 is a tubular guide ring 14 which is preferably but not necessarily of chrome plated metal.

A plant lowering and elevating sleeve 16 of canvas or other suitable flexible material is slidable through and over the tubular ring 14, said sleeve being operable in the tube 8. The sleeve 16 comprises a closed inner end 18 having mounted therein a follower in the form of a disc 20 of suitable wood or other suitable material. The outer end of the sleeve 16 is open and detachably secured in a ring 22 of suitable material which encircles the tube 8 in spaced relation thereto and is vertically movable on said tube. The inner periphery of the operating ring 22 is provided with a circumferential groove 24 (see FIGURE 4) in which the open outer end portion of the sleeve 16 is detachably secured through the medium of an expansion ring 26.

Mounted on the base 10 on diametrically opposite sides of the tube 8 and in spaced relation thereto is a pair of generally Z-shaped rotatable clips or anchors 28 for the ring 22. The clips 28 include angularly bent lower end portions which are apertured to receive fasteners 30 which rotatably secure said clips to the base 10. The clips 28 further include oppositely angularly bent upper end portions 32 which are engageable with the top of the ring 22 for securing said ring in lowered position on the base 10.

It is thought that the use of the invention will be readily apparent from a consideration of the foregoing. Reference numeral 34 designates generally a plotted plant to be sacked or bagged. Toward this end, the ring 22 is moved downwardly on the cylindrical tube 8 and secured on the base 10 through the medium of the clips 28, thus elevating the follower 20. The bottom portion 36 of a bag 38 of transparent plastic or other suitable material is then inserted in the upper portion of the device for engagement on the follower 20, the major portion of said bag being folded downwardly around the tube 8 as best seen in FIGURE 3 of the drawing. The potted plant 34 is then placed in the upper portion 36 of the bag 38 where it is supported by the follower 20 in an obvious manner. The ring 22 is then released for permitting the follower 20 with the potted plant 34 thereon to be lowered by gravity in the tube 8. When this occurs the bag 38 is pulled downwardly into the tube 8 in a manner to substantially enclose the potted plant 34, said bag sliding easily over and through the tubular guide ring 14. As the potted plant and bag travel downwardly at the same speed, no rubbing action therebetween occurs. Thus, all damage to the plant from this source is avoided. With the potted plant and bag in the lowered position of FIGURE 4 of the drawing, the top or mouth portion of said bag is closed and stapled, as indicated at 40. The completed package may now be moved from the device. This may be readily accomplished by simply lifting the package out of the tube 8 or the follower 20 may again be elevated and secured where it is ready for the next operation. By removing the ring 26, the elevating and lowering ring 22 may be removed from the sleeve 16. Thus, should the sleeve 16 become worn said sleeve may be readily replaced, permitting the ring 22 to be used indefinitely.

To package the potted plant in an inverted sack or bag, said plant is lowered into the tube 8 on the follower 20. The open mouth portion of the inverted bag is then gathered or pleated and telescoped downwardly over the upper exposed portion of the sleeve 16 and held in any suitable manner on the elevated ring 22 as shown in FIGURE 5 of the drawing. The ring 22 is then moved downwardly for pulling the bag 38 downwardly on the sleeve 16 and the tube 8 while simultaneously elevating the potted plant on the follower 20. The ring 22 may then be secured by the clip 28 for supporting the potted plant 34 with the inverted bag 38 thereon. The potted plant and inverted bag may then be readliy removed, after which the bottom portion of the bag may be closed and stapled beneath the pot as illustrated at 42.

FIGURES 7–10 illustrate a modified form of the invention. In this embodiment the floral sacker includes a base 44, similar to base 10, and a series of rubber feet 46 project downwardly from the base 44 and space the base from the table or other supporting structure.

Extending upwardly from the base 44 is a tube or cylinder 48 which corresponds to the tube 8 of the first embodiment. Mounted on the upper end of the tube 48 are a series of brackets 50 which support a circular rod 52 and a series of balls or spherical beads 54 are mounted for rotation on the rod 52. The beads 54 are spaced sufficiently apart to provide free rotation of each bead on the rod without interference with adjacent beads.

A flexible sleeve 56 made out of canvas, plastic or the like is draped over the beads 54 and the inner closed end of the sleeve is located within tube 48 and supports the plant to be bagged, while the outer end of the sleeve extends downwardly along the outer surface of the tube 48 and is connected to a locking ring 58. The outer end of the sleeve 56 is mounted within an annular recess formed in locking ring 58 by a split ring coupler 60. The resiliency of the split ring 60 urges the end of the sleeve 56 within the recess in the locking ring 58, but yet permits the locking ring 58 to be rotated with respect to the sleeve 56 without the flexible sleeve being twisted as the ring is rotated.

Connected to the inner end of the sleeve 56 is a support plate or follower 62, corresponding to follower 20 of the first embodiment, and the plant 64 or cut flowers contained within a pot 66 is supported on the follower 62.

By locking the locking ring 58 with respect to the base 44, the sleeve 56, as well as the plant carried by the sleeve, will be prevented from moving downwardly within the tube. To lock the ring 58 to the base 44, the ring is rotated so that the corners 68 of the ring engage locking clips 70 mounted on the corners of the base 48, as shown in the phantom lines in FIGURE 8. By rotating the locking ring 58 counterclockwise to the full line position shown in FIGURE 8, the corners 68 will move out of engagement with the clips 70, thereby permitting the ring and the attached sleeve 56 to move upwardly with respect to the tube 48.

The corners 68 of locking ring 58 not only serve to engage the locking clips, but in the unlocked position project outwardly beyond the corresponding sides of the base 44, and provide hand holds for the operator to lift the ring 58 upwardly if the weight of the plant is not sufficient to move the follower and plant 64 downwardly by gravity.

Figure 10:
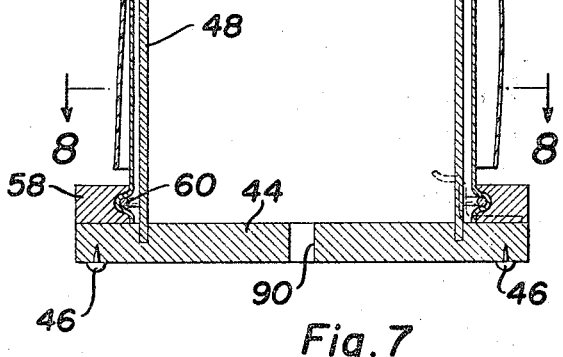
FIGURE 10 is a perspective view of the holder for retaining the pot or vase.

The plant 64 is adapted to be bagged within a protective plastic bag 72 similar in structure to bag 38 of the first embodiment. As shown best in FIGS. 7 and 10, the pot 66 has a smaller diameter than the follower 62 and thus is centered on the follower by means of a pot holder 74. As shown in FIGURE 10, the pot holder includes a generally circular base 76 and a pair of halves 78 are hinged to the base 76, as indicated by 80. The central portion of each half 78 is provided with a series of segments 82 which are separated from each other by radially extending cuts 84. In addition, a series of folds or scores 86 are formed in each of the segments 82.

The pot 66 is mounted on the holder 74 by initially positioning the pot centrally of the base 76. The halves 78 are then folded upwardly around the pot 66 with the segments bending along the scores 86 to firmly position the pot on the holder 74. The two halves 78 can be stapled together, as indicated by 88, to hold the segments in tight bearing engagement with the pot 70. As previously mentioned, the holder 74 serves to firmly hold the pot 66 and centers the pot with respect to the follower 62.

Figure 7:
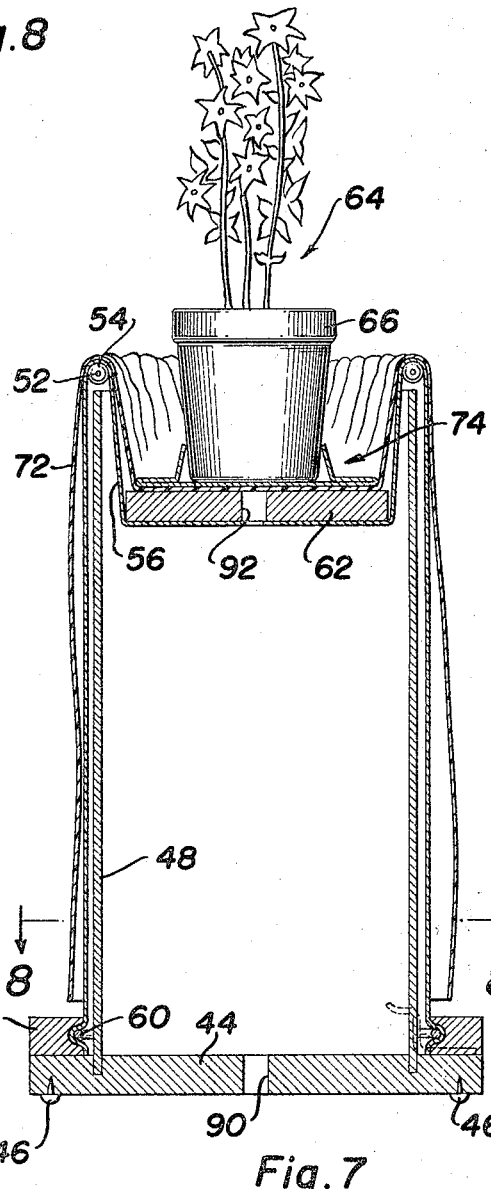
FIGURE 7 is a vertical section of a modified form of the invention.
Figure 9:
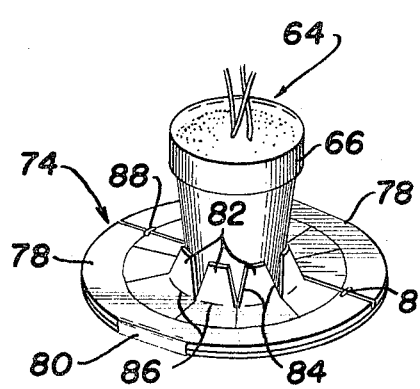
FIGURE 9 is a fragmentary perspective view of the upper end of the tube showing the spherical rollers.

The floral sacker illustrated in FIGURES 7–10 operates in a manner similar to that shown in FIGURES 1–3. With the locking ring 58 in the locked position, the closed end of the bag 72 is positioned on the follower 62, and the bag is draped over the rollers 54 so that the open end of the bag is located outwardly of the tube 48 and sleeve 56, as shown in FIGURE 7. The plant 64 is then placed on the follower 66 and the locking ring 58 is released. If the weight of the plant 64 is sufficient the follower 62 and plant will move downwardly within the tube with the sleeve 56 and the plastic bag 72 riding over the beads or bearings 54 at the upper edge of the tube 48. If the plant is relatively light in weight, the locking ring 58 can be lifted to thereby aid in moving the follower and plant downwardly within the tube 48.

As the follower 62 moves downwardly within the tube 48, the air within the tube is vented or exhausted through an opening 90 formed in the base 44 and through an opening 92 formed in the follower 62 and the sleeve 56.

During downward movement of the follower 62 and plant 64 within the tube 48, the sleeve 56 and the bag 72 ride smoothly over the beads 54 at the upper end of the tube. As the sleeve 56 and the bag 72 move into the tube 48, they gather into a series of folds to accommodate the smaller internal diameter. The beads 54 enable the material of the sleeve 56 and the bag 72 to be gathered in a series of small, uniformly positioned folds which correspond generally in spacing to the spaces between the beads. This structure eliminates the formation of large folds in the sleeve and bag which could possibly occur when using a rod for the support at the upper end of the tube. By eliminating large folds or gathers in the material, the problem of the leaves or flowers of the plant being caught or pinched within large folds is eliminated.

The locking ring 58 can be readily rotated with respect to the sleeve 56 and moved from a locking to an unlocking position. As the ring 58 is moved from the locked position the corners 68 project outwardly beyond the corresponding sides of the base 44 and serve as hand holds which enable the operator to move the locking ring upwardly if the weight of the plant on the follower 66 is not sufficient to move the follower downwardly by gravity.

The vent holes 90 and 92 permit the air within tube 48 to be exhausted as the follower 62 moves downwardly within the tube, so that the follower can move smoothly and the sleeve and bag will not be deformed in shape by escaping air.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

Various modes of carrying out the invention are contemplated as being within the scope of the following claims, particularly pointing out and distinctly claiming the subject matter which is regarded as the invention.

I claim:

1. An apparatus for sacking an article within a protective bag, comprising a base, a tube mounted on the base, a flexible member mounted for movement within said tube and having a first end located within the tube and having a second end located outside the tube and having a central portion extending over an end of said tube, one of the ends of said flexible member being engaged with a protective bag, means connected to the first end of said flexible member for supporting an article to be sacked, and means for moving the flexible member vertically within the tube with vertical movement of said flexible member serving to insert the article within the bag.

2. The apparatus of claim 1 and including locking means connected to the second end of the flexible member for preventing movement of the flexible member with respect to said tube.

3. The apparatus of claim 2 in which said locking means comprises a locking ring movable from a locked to an unlocked position and connected to said second end of the flexible member, said locking ring having a portion projecting outwardly beyond the base when in the unlocked position to serve as a hand hold for elevating said locking ring with respect to the tube.

4. An article sacker comprising a base, a vertical tube mounted on said base, a flexible annular member having one end disposed within said tube and movable over the upper end thereof, a follower connected to the flexible member and located within the tube and adapted to support an article to be sacked with the bottom of a sack located between the follower and the article and anchored to the follower by said article, said follower being movable downwardly in the tube to lower the article and simultaneously pull the sack downwardly into the tube and around said article, and means for elevating the follower.

5. The sacker of claim 4, in which said flexible member comprises a sleeve having an inner end disposed within the tube and connected to the follower and having an outer end located on the exterior of said tube.

6. The sacker of claim 5, in which said means for elevating the follower comprises a ring connected to the outer end of the sleeve and encircling the tube and movable thereon.

7. The sacker of claim 6, and including means on said base for securing said ring thereto and thereby preventing relative movement of said sleeve and said follower with respect to the tube.

8. The sacker of claim 6, in which said ring encircling the sleeve is provided with a circumferential groove in its inner periphery for receiving said sleeve, and an annular expension member anchoring the sleeve in said groove for removably securing said ring on the sleeve.

9. The sacker of claim 7, in which said last named means comprises a locking member mounted on the base and said ring is rotatable with respect to the sleeve and engageable with said locking member to thereby lock said ring with respect to the base.

10. The sacker of claim 4 and including vent means providing communication between the interior of the tube and the atmosphere to vent air from said interior as said flexible member and follower move downwardly within the tube.

11. The apparatus of claim 10, in which said vent means comprises a hole in said base, and said sacker also includes a plurality of legs extending downwardly from said base to space the base above a supporting structure.

12. The apparatus of claim 4 and including a roller means rotatably mounted on the upper end of the tube and adapted to support said flexible member in movement as said flexible member moves with respect to the tube.

13. The apparatus of claim 12 in which said roller means comprises a series of circumferentially arranged, generally spherical rollers.

14. The sacker of claim 4, in which the article to be sacked is contained within a pot, and said sacker also includes means for centering the pot on said follower.

References Cited

UNITED STATES PATENTS

| 2,989,828 | 6/1961 | Warp | 53—390 |
| 3,360,901 | 1/1968 | Gallo | 53—390 |

FOREIGN PATENTS

| 1,026,259 | 4/1966 | Great Britain. |

TRAVIS S. McGEHEE, *Primary Examiner.*

R. L. SPRUILL, *Assistant Examiner.*